(12) United States Patent
Harvey et al.

(10) Patent No.: US 8,608,448 B2
(45) Date of Patent: Dec. 17, 2013

(54) SHROUDLESS BLADE

(75) Inventors: Neil William Harvey, Derby (GB); Stephane Michel Marcel Baralon, Derby (GB)

(73) Assignee: Rolls-Royce PLC (GB)

( * ) Notice: Subject to any disclaimer, the term of this patent is extended or adjusted under 35 U.S.C. 154(b) by 789 days.

(21) Appl. No.: 12/820,500

(22) Filed: Jun. 22, 2010

(65) Prior Publication Data
US 2010/0329848 A1 Dec. 30, 2010

(30) Foreign Application Priority Data
Jun. 24, 2009 (GB) .................. 0910838.2

(51) Int. Cl.
*B63H 1/26* (2006.01)
*B64C 11/16* (2006.01)

(52) U.S. Cl.
USPC .............. 416/228; 416/235; 416/236 R

(58) Field of Classification Search
USPC ............ 416/173.1, 173.5, 174, 228, 223 R, 416/231 R, 231 B, 231 A, 236 R; 415/173.1, 415/173.5, 174
See application file for complete search history.

(56) References Cited

U.S. PATENT DOCUMENTS

| | | | |
|---|---|---|---|
| 6,254,346 B1 * | 7/2001 | Fukuno et al. | 416/97 R |
| 6,568,909 B2 * | 5/2003 | Szucs et al. | 416/228 |
| 2003/0059309 A1 | 3/2003 | Szucs et al. | |

FOREIGN PATENT DOCUMENTS

EP 1947294 A2 7/2008

* cited by examiner

*Primary Examiner* — Edward Look
*Assistant Examiner* — Christopher J Hargitt
(74) *Attorney, Agent, or Firm* — McCormick, Paulding & Huber LLP

(57) ABSTRACT

A shroudless blade for use in a compressor or fan of an axial flow gas turbine engine includes a treatment to the tips of the blades to improve the surge margin of the compressor. A series of cross bleed holes are formed at the tip of the blade, which may be a stator or rotor component, extending between the pressure and suction sides of the blades. Notches are provided at the tip of the blades to provide initiation sites for any fatigue cracks such that the cracks propagate from the base of these slots or notches and radially inwards into the body of the blades. The present invention provides an arrangement, which by provision of the cross bleed holes the propagation of the cracks is arrested. A preferred placement and orientation for the holes for best mechanical and aerodynamic performance is described.

19 Claims, 4 Drawing Sheets

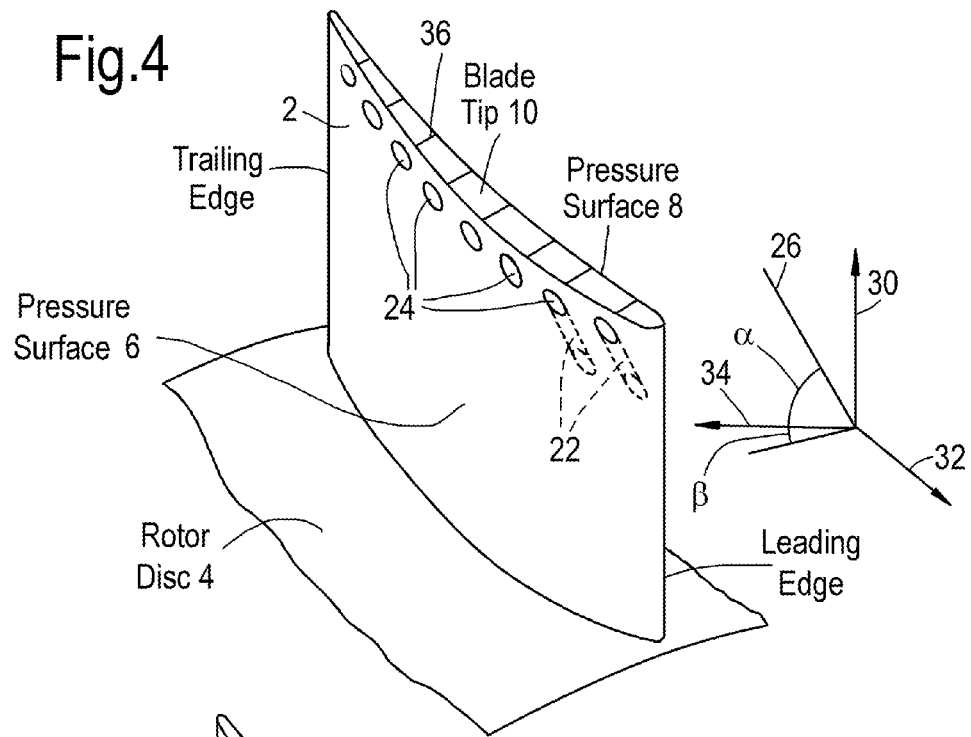
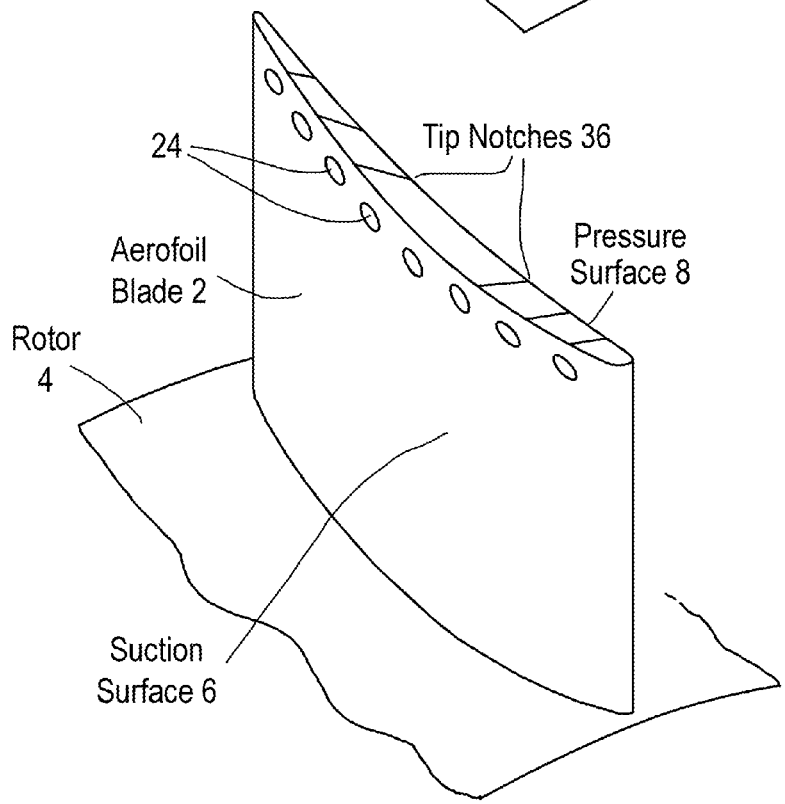

though it is the blades and not the wall that are moving in the compressor. It will be observed that the leakage flow from the pressure side of the blade to the suction side and especially its interaction with the main gas flow generates the clearance vortexes, which are a potential source of stall and flutter conditions and are generally undesirable.

SHROUDLESS BLADE

CROSS REFERENCE TO RELATED APPLICATION

This application is entitled to the benefit of British Patent Application No. GB 0910838.2, filed on Jun. 24, 2009.

FIELD OF THE INVENTION

The invention relates to a shroudless blade for use in a stage of an axial flow rotor in a compressor or fan.

BACKGROUND OF THE INVENTION

In particular, the invention concerns a shroudless blade or vane for use in the compressor or fan of an axial flow gas turbine engine.

Each stage in a compressor comprise an array of rotating blades and static vanes that are orientated relative to each other to raise the static air pressure while maintaining axial velocity at a near constant level. The compressor is designed so that when operating at its working line the rate of deceleration, or diffusion, of the airflow through each of the blade or vane stages is limited to avoid flow separation and subsequent surge, stall or flutter.

In a rotor of shroudless blades there is simply a clearance gap between the tip end surface of each blade and the inner surface of the rotor casing wall. Each blade aerofoil turns incident airflow, in its own frame of reference, and in doing so generates aerodynamic lift, which produces a pressure difference between the opposing side surfaces of the aerofoil. Hence, these side surfaces are often referred to as pressure and suction surfaces. The tip clearance gaps provide a gas leakage path between the higher pressure side of the aerofoil (pressure surface) and the lower pressure side (suction surface). This effect is analogous to an electrical "short circuit".

FIG. 1 of the accompanying drawings provides a schematic illustration of this leakage flow and its development in a compressor rotor. A portion of a compressor rotor is shown comprising two shroudless compressor blades, indicated generally at 2, and a portion of the rotor hub 4. In the drawing the direction of the main gas flow is generally away from the viewer, so that the suction surfaces 6 of the compressor blades are facing the viewer and the pressure surfaces 8 are on the hidden sides of the blades. The wall of the compressor casing is omitted for clarity so that the tip clearance distance is not directly depicted. However, as previously mentioned such a clearance exists between the tips 10 of the compressor blades 2 and the internal surface of the casing and produces overtip clearance flows indicated at 12 in the illustration. In the immediate vicinity of the aerofoil suction surfaces 6 the overtip leakage flows 12 interact with the main gas flow and generate clearance vortexes 14. This mixing of the leakage flow and main gas reduces the aerodynamic efficiency of the rotor stage and can be an important factor in the causes of stall and flutter.

According to GB Patent No. 736,835 published in 1955, it was already known in the field of propeller design for use on liquid media to provide apertures near the tips of propeller blades in order to promote a bleed flow from the high pressure side of the blade to the low pressure side in an attempt to fill up the spaces brought about by cavitation. Moreover, it was acknowledged that it was also known in the field of flow machines for gaseous mediums to generate a secondary flow from the high pressure to the low pressure side of blades by means of slots extending the whole height of the blade. However, such slots severely comprised the mechanical strength of the blade and were disregarded for machines operating at high speeds of rotation. In order to combat the secondary flow effects while retaining the mechanical strength of the blades GB 736,835 proposed to form in the body of a shroudless blade apertures in zones near the casing wall for the purpose of bleeding a proportion of the flow from the high-energy (high pressure) side of the blade to the low-energy (low pressure) side. The apertures could be in the form of simple slots or diagonally extending bores, having a depth of approximately $\frac{1}{5}^{th}$ of the overall height of the blade body. Slots of such depth have not been adopted, at least in part due to the higher mechanical strength required of more recent, higher performance blade designs.

SUMMARY OF THE INVENTION

According to the present invention, there is provided a shroudless blade for use in an axial flow rotor stage having a body with pressure (8) and suction (6) surfaces on opposite sides of the blade, a span extending between a root and a tip and a chord extending between a leading edge (2) and a trailing edge (8), characterised in that formed in the end tip of the blade are a plurality of slots or notches (36) which extend between the pressure and suction sides and within 15% of the span of the blade from the tip a plurality of holes (24) formed through the body of the blade between said pressure and suction surfaces and arranged in a chordwise extending array.

Preferably, the number of slots or notches is less than or equal to the number of holes. Each hole is preferably located under a slot or notch and the centre lines thereof are aligned.

It is also preferred to align the centre line of a hole to be convergent with the centre line of a corresponding slot or notch in a downstream direction, and furthermore that a hole is positioned and arranged to provide that the jet issuing from its outlet intercepts a leakage flow over the blade tip.

BRIEF DESCRIPTION OF THE DRAWINGS

FIG. 4 illustrates a perspective view of a shroudless compressor blade of the kind shown in FIG. 2 having cross-bleed holes near to its tip surface;

FIG. 5 illustrates a perspective view of the compressor blade of FIG. 4 with additional cross-notches in its tip surface;

DETAILED DESCRIPTION OF THE PREFERRED EMBODIMENTS

Figure 1:
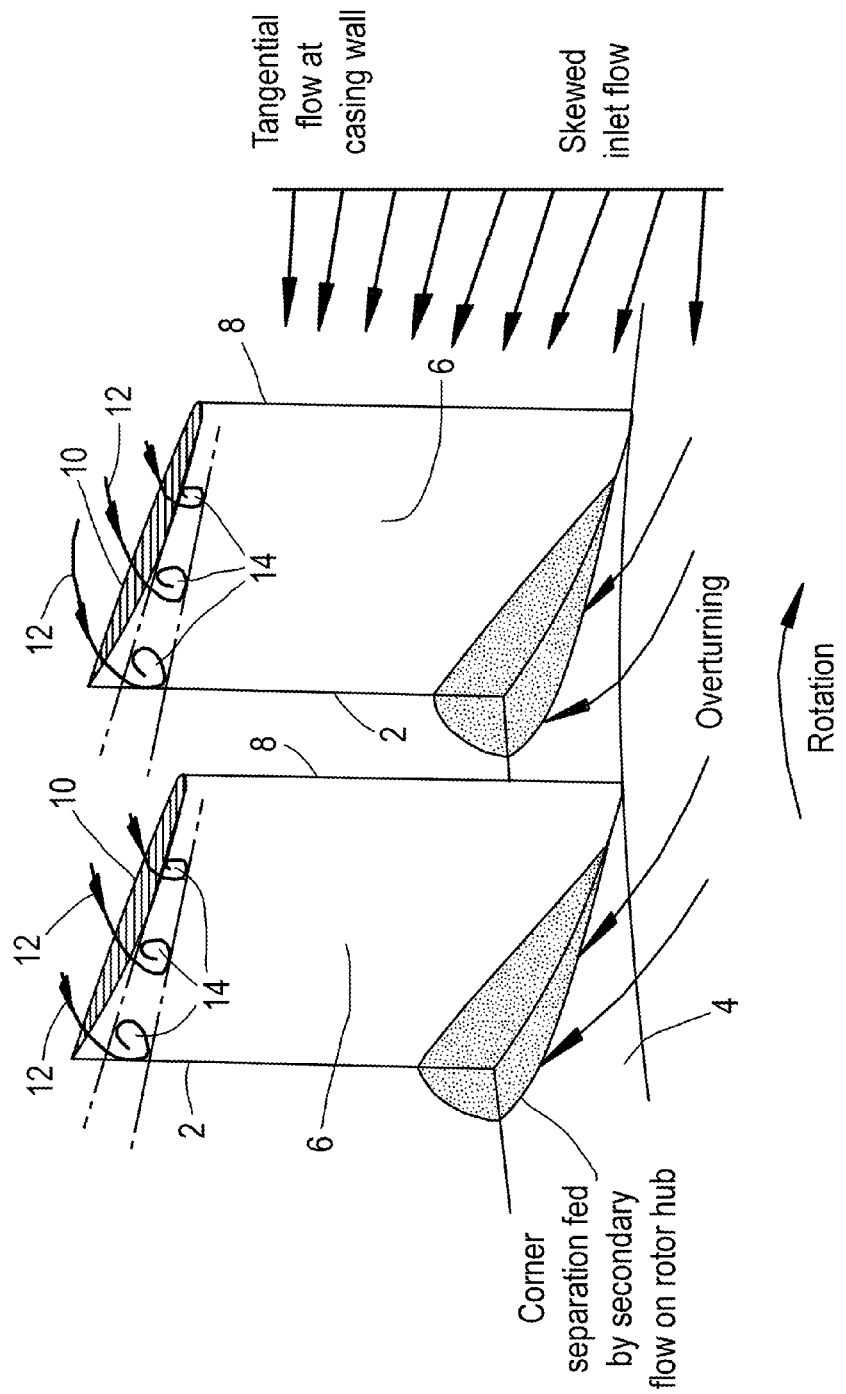
FIG. 1 illustrates viscous gas flows around shroudless compressor blades and rotor hub of an axial flow compressor.

Referring now to the drawings, in which like parts carry like references, FIG. 1 as previously discussed illustrates viscous gas flows in a row of typical shroudless compressor blades. Of particular interest in respect of the present invention are the overtip leakage flows, which are effectively part of the boundary layer adhering to the inner surface of the wall of the compressor casing and the manner in which this flow or layer interacts with the surface flows of the working fluid over the aerodynamic surfaces of the body of the blade and with the main gas flow. A large number of flows are present in a working compressor stage, and their interaction is complex and variable over the range of operating speeds. There is the main gas flow into the engine, which is driven by the rotation of the compressor stage and, possibly also by a ram effect in the case of propulsion engines. In addition, on all surfaces exposed to the gas flow there is a boundary layer present and these layers can interact at a number of positions by variable amounts according to the relative velocity of the moving parts of the compressor.

Figure 2:
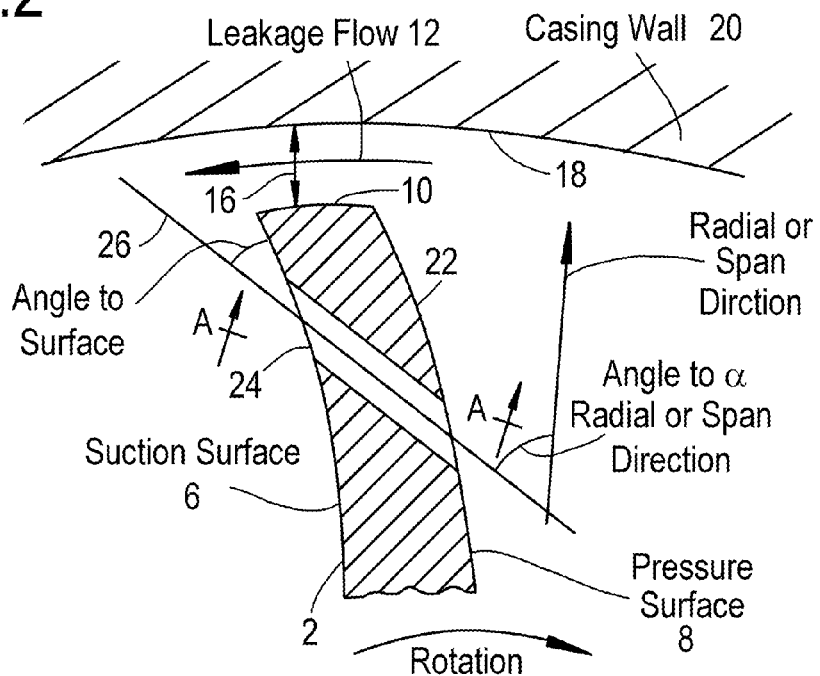
FIG. 2 shows a radial section through a shroudless compressor blade having a cross-bleed hole near its tip.

Referring now to FIG. 2 the invention is particularly concerned with the leakage flow 12 over the tip of a compressor blade 2. This flow passes through a gap 16 between the radial end surface 10 of the blade 2 and the inner surface 18 of the compressor casing wall 20. The normal direction of rotation of the rotor has blade 2 moving in a clockwise direction in the plane of the drawing relative to the compressor casing wall 20, so that the leakage flow 12 is illustrated as moving in an anti-clockwise direction. In operation the rotation of the compressor rotor creates a pressure differential between opposing pressure and suction sides of the blade, the pressure being higher at pressure surface 8 than at the suction surface 6. Thus, the total effective leakage flow past the blade tip end surface 10 includes a boundary layer component adhering to the surface 18 of the compressor casing wall 20 and an overtip flow between blade pressure and suction surfaces 6, 8. Towards the radial tip of a compressor rotor, or the hub of a shroudless stator, on the suction side these flows interact with the main stream flow to form a clearance vortex (shown in FIG. 1 for a rotor). In particular, the tip leakage flow 12 has an axial component of velocity that is negative, that is, in the upstream direction. Since the leakage and main stream flows have axial velocity components that are opposed there is a shear layer between the two. As a result the two flows roll into a vortex where they mix together. Near the compressor working line the mixing process is enough that all the negative axial momentum, of the leakage flow 12, is overcome and all the compressor flow exits downstream of the aerofoil row. As the compressor moves above the working line, typically when the compressor is throttled, the aerofoils go into high positive incidence and the vortex 14 grows. The extra blockage of the vortex interrupts the flow through the passageways between adjacent compressor blades. Ultimately, mixing with the free stream is not enough to overcome the negative axial momentum of leakage 12 and this leads to stall of the flow at the rotor tips (or stator hubs) and ultimately a compressor surge.

For an element of control and to postpone breakdown of normal compressor flows, that is in order to increase the stall margin of the compressor and in accordance with the present invention a number of small diameter, cross-bleed holes 22 are formed through the body of the blade 2 towards or close to the tip 10. The illustration of FIG. 2 shows one such cross-bleed hole 22, it will be understood that it is proposed that here should be a plurality of such holes 22 spaced apart along the chord of the blade 2. The spacing of such cross-bleed holes does not need to be even nor symmetrical with respect to the leading and trailing edges of the blade. In effect the holes provide an additional leakage path from the pressure side 8 of a compressor blade to the suction side 6. Although this additional leakage represents a further loss of aerodynamic efficiency of a blade the loss may be more than compensated by the gain in stability and increased operating range.

Figure 3:
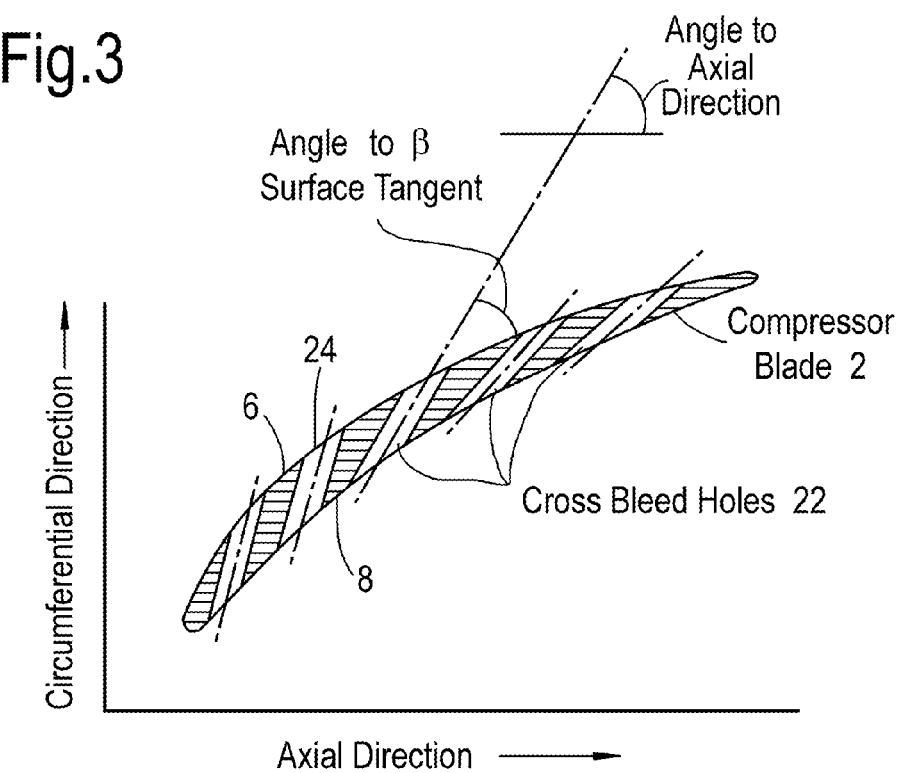
FIG. 3 shows an illustration of a cross-section through the blade of FIG. 2 in the direction of arrows A-A.

The axis 26 of a hole 22 is formed at an angle α with respect to the radial or span direction of the blade as shown in FIG. 2. Angle α is selected so that the jet of gas issuing from the exit orifice 24 of cross-bleed hole 22 has a component of velocity taking it towards the compressor casing wall 20 and to intercept the leakage flow 12 over the blade tip 10. The angle α is at least 10° (ten degrees) and not more than 90° (ninety degrees). In addition a cross-bleed hole 22 is formed at a compound angle with respect to the radial and axial axes of the compressor rotor. FIG. 3 shows a plan view of a cross-section through the blade 2 of FIG. 2 that is in a plane at right angles to the view shown in FIG. 2.

In FIG. 3, for reference the axial and circumferential directions are depicted as a pair of mutually perpendicular axes. The cross-bleed holes 22 are shown as having rectilinear axes which subtend an acute angle β relative to a tangent to the surface of the blade at the location of the exit orifice. Preferably the subtended angle β is at least 10° (ten degrees) and substantially less than 90° (ninety degrees). Preferably the exit orifice 24 of a cross-bleed hole 22 is located within 15% of the aerofoil span of the rotor tip and may be as close as 1% of the blade span. That is the distance between an exit orifice 24 and a blade tip surface 10 is in the range from 1% to 15% of the total height, or distance between the root and tip, of the blade 2. In one preferred embodiment of the invention all of the holes 22 are formed at the same angle(s) with respect to a surface tangent, for ease of manufacture, but this is not to exclude the possibility that the angle at which individual cross-bleed holes are formed may be optimised for each location.

FIG. 4 illustrates a perspective view of a compressor blade 2 formed in accordance with the present invention. A row of exit orifices 24 of cross-bleed holes 22 are shown on the visible suction surface 6. The compound angle at which the holes are formed are depicted by the insert showing three mutually orthogonal axes 30, 32, 34 with which the radial or span axis 30, the axial or rotational axis 32, and a tangent 34 to a circumference of blade rotation are shown. The cross-bleed hole axis 26 is indicated together with projections of the axis 26 onto two mutually perpendicular planes formed by the axes 30, 34 which resolve the angles α and β respectively since angle α is resolved in the plane of the radial and tangential directions.

Figure 6:
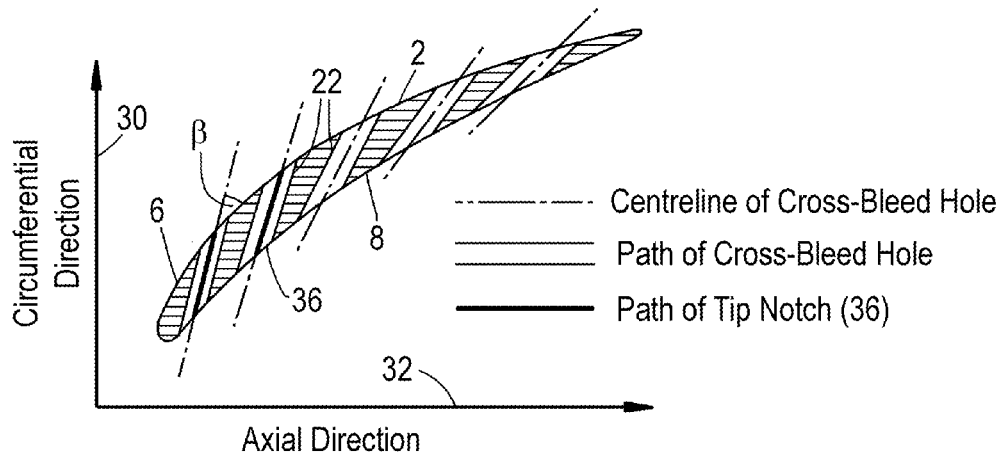
FIG. 6 shows a schematic cross-section through the blade of FIG. 5 to illustrating alignment of the cross-bleed holes and notches.
Figure 7:
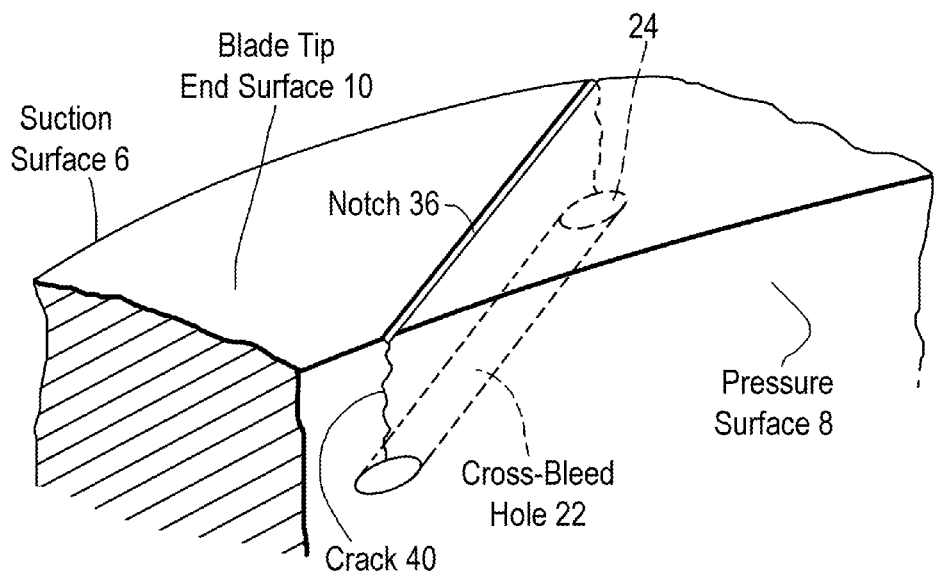
FIG. 7 shows a detail view of a fragment of the blade of FIGS. 5 and 6 to illustrate the proximity of the holes and notches.

FIG. 5 shows an illustration corresponding to FIG. 4 of a compressor blade 2 formed in accordance with the present invention and having cross-bleed holes 22 and tip notches 36. The notches 36 comprise a plurality of shallow grooves formed in the tip end surface 10 of the compressor blade 2. It will be apparent from the illustration of FIG. 6 that as with the cross-bleed holes the grooves 36 are formed at angle β with respect to a tangent to the blade surface at the location where the groove or notch 36 intersects the suction surface side 6 of the blade. It will be appreciated that these grooves 36 are not capable of being formed at a compound angle, although the possibility of the depth of a groove 36 varying along its length is not excluded. It is a preferred feature of the invention for optimum performance that a hole 22 is formed immediately under a groove 36. The numbers of holes does not need to be the same as the number of grooves, generally there are at least as many or more holes as grooves. Therefore under each groove 36 lies a cross-bleed hole 22. The separation distance between the base of a groove and a hole may vary along the path of each due to the angle α subtended between the axis of a hole 22 and a radial axis 30 (see the insert in FIG. 4) and, if present, the varying depth of the groove 36 itself. Each of the notches preferably have a lateral dimension that is of the order one thousandth ($1/1000^{th}$) of the chord of the aerofoil blade body and at this size are too small to provide any significant leakage flow. By of the order it is meant +/−15%. The depth of each notch is preferably of the same size order as its lateral dimension. A typical compressor blade has a minimum chord of between 15 and 30 mm depending on the blade.

It has been found in practice that where cracks occur in the tips of compressor blades embodying the invention the crack commences at a groove 36 and progresses downwards to terminate at the hole 22, which lies under the said groove. The holes 22 are preferably circular in cross-section for ease of manufacture, but are not exclusively so and they may have an elliptical cross-section, ovoid or another generally smooth and regular shape. Furthermore, the holes 22 are not exclusively straight, although this is likely to be the most cost effective to manufacture, but they may be curved. The cross-sectional area may vary along their length although, again, a constant area is likely to be the easiest and most cost effective to produce. As previously mentioned, the angular orientation of holes 22 may be combined with three-dimensional blade shaping which would allow further reduction of the effect of clearance flows on surge margin to be optimised. In a particular blade design the holes may therefore be formed at different radial/span heights and need not be aligned at a constant angle α. From an aerodynamic view point it is necessary for the air jet issuing from the exit orifice 24 of a cross-bleed hole 22 to have a radial velocity component sufficient for the jet to interact with the overtip clearance flow 12. However, it is desirable that the radial component should not be too high. The total flow velocity of the jet from a hole 22 is determined by the pressure drop between the entry and exit ends of the hole, as the radial component increases the axial velocity component is decreased and it is desirable to have as high an axial component as possible. A preferred arrangement is therefore inevitably a compromise between conflicting requirements and is highly dependent upon individual blade design parameters.

Although the invention has been described primarily to rotating blades of a rotor assembly it is equally applicable to shroudless blades of stator vanes. These vanes typically have a larger spacing from the drum wall than that of the rotating blades since gouging of the drum by the stators would be mechanically disastrous for the drum. However, the unsupported end of vanes, like rotor blades, are still prone to cracking from fatigue. It will be appreciated that the present invention provides an elegant and useful way to achieve controlled cracking whilst improving efficiency.

What is claimed is:

1. A shroudless blade for use in an axial flow rotor stage comprising:
    a body with pressure and suction surfaces on opposite sides of the blade, a span extending between a root and a tip, and a chord extending between a leading edge and a trailing edge,
    wherein a plurality of slots or notches are formed in the end tip of the blade which extend between the pressure and suction sides and within 15% of the span of the blade from the tip a plurality of holes are formed through the body of the blade between said pressure and suction surfaces and arranged in a chordwise extending array, each hole is located radially inboard of a slot or notch and the centre lines thereof are radially aligned.

2. A shroudless blade as claimed in claim 1 wherein the number of slots or notches is less than or equal to the number of holes.

3. A shroudless blade as claimed in claim 1, wherein the centre line of a hole is convergent with the centre line of the corresponding slot or notch in a downstream direction.

4. A shroudless blade as claimed in claim 1, wherein the lateral dimensions of a slot or notch are approximately one thousandth ($1/1000$.sup.th) of the chord of the aerofoil blade body.

5. A shroudless blade as claimed in claim 1, wherein at least one of the holes has a cross section which is round.

6. A shroudless blade as claimed in claim 1, wherein at least one of the holes has a cross section which is generally smooth along its length but is not round.

7. A shroudless blade as claimed in claim 5, wherein the cross section of the holes varies in area along the length of the hole.

8. A shroudless blade as claimed in claim 5, wherein the holes have a straight bore.

9. A shroudless blade as claimed in claim 5, wherein the holes have a bore which is curved along its length.

10. A shroudless blade as claimed in claim 1, wherein the holes are located at different lengths from the blade root.

11. A shroudless blade for use in an axial flow rotor stage comprising:
    a body with pressure and suction surfaces on opposite sides of the blade, a span extending between a root and a tip, and a chord extending between a leading edge and a trailing edge,
    wherein a plurality of slots or notches, formed in the end tip of the blade, extend between the pressure and suction sides, the lateral dimensions of a slot or notch are approximately one thousandth ($1/1000$.sup.th) of the chord of the aerofoil blade body, and within 15% of the span of the blade from the tip a plurality of holes are formed through the body of the blade between said pressure and suction surfaces and arranged in a chordwise extending array.

12. A shroudless blade as claimed in claim 11, wherein the number of slots or notches is less than or equal to the number of holes.

13. A shroudless blade as claimed in claim 11, wherein the centre line of a hole is convergent with the centre line of the corresponding slot or notch in a downstream direction.

14. A shroudless blade as claimed in claim 11, wherein at least one of the holes has a cross section which is round.

15. A shroudless blade as claimed in claim 11, wherein at least one of the holes has a cross section which is generally smooth along its length but is not round.

16. A shroudless blade as claimed in claim 14, wherein the cross section of the holes varies in area along the length of the hole.

17. A shroudless blade as claimed in claim 14, wherein the holes have a straight bore.

18. A shroudless blade as claimed in claim 14, wherein the holes have a bore which is curved along its length.

19. A shroudless blade as claimed in claim 11, wherein the holes are located at different lengths from the blade root.

* * * * *